US010110355B2

(12) United States Patent
Belghoul et al.

(10) Patent No.: US 10,110,355 B2
(45) Date of Patent: Oct. 23, 2018

(54) UPLINK TRANSMISSION ON UNLICENSED RADIO FREQUENCY BAND COMPONENT CARRIERS

(71) Applicant: Apple Inc., Cupertino, CA (US)

(72) Inventors: Farouk Belghoul, Campbell, CA (US); Tarik Tabet, Los Gatos, CA (US); Dawei Zhang, Saratoga, CA (US); Huarui Liang, Beijing (CN)

(73) Assignee: Apple Inc., Cupertino, CA (US)

( * ) Notice: Subject to any disclaimer, the term of this patent is extended or adjusted under 35 U.S.C. 154(b) by 329 days.

(21) Appl. No.: 14/636,028

(22) Filed: Mar. 2, 2015

(65) Prior Publication Data

US 2015/0256303 A1    Sep. 10, 2015

Related U.S. Application Data

(60) Provisional application No. 61/950,388, filed on Mar. 10, 2014.

(51) Int. Cl.
*H04L 5/00* (2006.01)
*H04J 11/00* (2006.01)
(Continued)

(52) U.S. Cl.
CPC ........ *H04L 5/0032* (2013.01); *H04J 11/0023* (2013.01); *H04L 5/001* (2013.01);
(Continued)

(58) Field of Classification Search
CPC .... H04W 72/1263; H04J 4/00; H04J 11/0023; H04J 11/005; H04L 1/1812; H04L 5/006; H04L 5/001
See application file for complete search history.

(56) References Cited

U.S. PATENT DOCUMENTS 9,184,886 B2    11/2015    Bontu et al.
9,265,055 B2     2/2016    Okuda
(Continued)

FOREIGN PATENT DOCUMENTS

CN    103518346 A    1/2014
CN    103580840 A    2/2014
(Continued)

OTHER PUBLICATIONS

LG Electronics Inc.,"LCP Impacts by Bearer Split", 3GPP TSG-RAN2 Meeting #83bis, R2-133536,Oct. 7-11, 2013.
(Continued)

*Primary Examiner* — Andrew W Chriss
*Assistant Examiner* — Voster Preval
(74) *Attorney, Agent, or Firm* — Dickinson Wright RLLP

(57) ABSTRACT

Methods and apparatus for using an unlicensed radio frequency band component carrier for uplink transmission are disclosed. A wireless communication device receives a carrier aggregation configuration, which can include at least one licensed radio frequency band component carrier and at least one unlicensed radio frequency band component carrier. The wireless communication device establishes a set of radio bearers and associates an unlicensed radio frequency band permission level with each of the radio bearers. The wireless communication device multiplexes uplink traffic for the radio bearers on the at least one licensed radio frequency band component carrier and the at least one unlicensed radio frequency band component carrier based at least in part on the unlicensed radio frequency band permission levels associated with the radio bearers.

20 Claims, 10 Drawing Sheets

(51) Int. Cl.
*H04W 76/16* (2018.01)
*H04W 16/14* (2009.01)

(52) U.S. Cl.
CPC ............ *H04L 5/006* (2013.01); *H04L 5/0091* (2013.01); *H04W 16/14* (2013.01); *H04W 76/16* (2018.02)

(56) References Cited

U.S. PATENT DOCUMENTS

| | | | |
|---|---|---|---|
| 9,608,782 | B2 | 3/2017 | Klatt |
| 2010/0284314 | A1* | 11/2010 | Pelletier .................. H04L 47/30 370/310 |
| 2011/0039562 | A1* | 2/2011 | Balasubramanian ........................ H04W 36/0033 455/436 |
| 2012/0250631 | A1 | 10/2012 | Hakola et al. |
| 2014/0342738 | A1 | 11/2014 | Ishii |
| 2015/0003435 | A1* | 1/2015 | Horn ..................... H04L 5/0058 370/338 |
| 2015/0131536 | A1 | 5/2015 | Kaur et al. |
| 2015/0156774 | A1* | 6/2015 | Urie ........................ H04L 5/001 370/329 |
| 2015/0195849 | A1* | 7/2015 | Bashar .................. H04W 16/14 370/330 |

FOREIGN PATENT DOCUMENTS

| | | |
|---|---|---|
| JP | 2014500685 A | 1/2014 |
| JP | 2014027548 A | 2/2014 |
| JP | 2014530538 A | 11/2014 |
| JP | 2015512228 A | 4/2015 |
| JP | 2015529035 A | 10/2015 |
| WO | WO2013040028 A2 | 3/2013 |
| WO | WO 2013138046 A1 * | 9/2013 ............ H04W 28/16 |
| WO | WO-2013138046 A1 * | 9/2013 ............ H04W 28/16 |
| WO | WO2013138046 A1 | 9/2013 |
| WO | WO2014008380 A1 | 1/2014 |

OTHER PUBLICATIONS

Japanese Patent Application No. 2015-045013—First Office Action dated Feb. 5, 2016.
Chinese Application for Invention No. 201510220677.0—First Office Action dated Nov. 30, 2017.

* cited by examiner

UPLINK TRANSMISSION ON UNLICENSED RADIO FREQUENCY BAND COMPONENT CARRIERS

CROSS-REFERENCE TO RELATED APPLICATIONS

This application claims the benefit of U.S. Provisional Application No. 61/950,388, entitled "UPLINK TRANSMISSION ON AN UNLICENSED BAND COMPONENT CARRIER," by Belghoul et al., filed on Mar. 10, 2014, the content of which is hereby incorporated by reference in its entirety for all purposes.

FIELD

The described embodiments relate generally to wireless communications technology. More particularly, the present embodiments relate to uplink transmission on an unlicensed radio frequency band component carrier by a carrier aggregation capable wireless communication device.

BACKGROUND

Modern wireless communication devices continue to evolve, offering an increasing array of capabilities, and are now virtually ubiquitously used by consumers to access a variety of data intensive services via wireless networks. For example, wireless communication devices are used to access a wide array of Internet services, such as audio/video streaming services, web browsing, and the like. The exponential increase in demand on wireless networks to support such data intensive services has placed a demand on wireless network operators to upgrade their wireless networks to support both increased data capacity and faster data rates. As such, ongoing efforts are being made to develop and deploy improved radio access technologies (RATs) capable of supporting higher throughput for data transmitted via wireless networks to satisfy the demand for data services from modern wireless communication devices.

Some modern cellular RATs, such as Third Generation Partnership Project (3GPP) Long Term Evolution (LTE) Release 10 and beyond, also referred to as LTE-Advanced (LTE-A), address the increased demand for data intensive services by implementing a technique known as carrier aggregation, in which radio frequency bandwidth available for communication can be extended through the aggregation of multiple component carriers (CCs). In this regard, rather than using a single carrier to support communication between a device and a wireless network, carrier aggregation uses multiple component carriers in parallel such that radio frequency bandwidth for data transmissions to and/or from a wireless communication device can be increased through the aggregation of multiple component carriers for conveying data transmissions.

While carrier aggregation techniques provide improved throughput for supporting data intensive services, there is a limited amount of licensed radio frequency spectrum available for LTE wireless network operators to use for carrier aggregation purposes. In this regard, wireless network operators of LTE and other cellular RATs are traditionally allocated (e.g., licensed) one or more defined radio frequency bands within the radio frequency spectrum for use to support cellular transmissions. This limited availability of licensed radio frequency spectrum available to wireless network operators is likely to make it increasingly difficult in the future for wireless network operators to accommodate the ongoing exponential growth in data traffic for advanced wireless communication devices. As such, wireless network operators and wireless communication device manufacturers are looking to the use of unlicensed radio frequency bands to accommodate additional data traffic growth. In this regard, unlicensed radio frequency bands, such as the 2.4 Gigahertz (GHz), 5 GHz, and other industrial, scientific, and medical (ISM) radio frequency bands, are free to use without a license. As such, LTE and other cellular RATs can be extended to use unlicensed radio frequency bands to expand their capacity. For example, unlicensed LTE (LTE-U) allows for the deployment of LTE in unlicensed radio frequency spectrum, e.g., for carrier aggregation purposes. However, given that unlicensed radio frequency spectrum is free to use, unlicensed radio frequency spectrum cannot match the quality of service provided by licensed radio frequency spectrum due to the unpredictability of interference from competing uses of the unlicensed radio frequency spectrum, such as from Wi-Fi devices. Uplink data that is sensitive to throughput, delay, latency, and/or other quality of service requirements can be particularly sensitive to the impact of interference in the unlicensed radio frequency spectrum. Accordingly, uplink transmission in the unlicensed radio frequency spectrum, such as for LTE-U capable systems, continues to be problematic.

SUMMARY

Some example embodiments provide techniques for uplink transmission on an unlicensed radio frequency band component carrier by a carrier aggregation capable wireless communication device. In this regard, some embodiments disclosed herein allow for efficient use of an unlicensed radio frequency band by a carrier aggregation capable wireless communication device while satisfying quality of service requirements that can be associated with some radio bearers. More particularly, the wireless communication device of some example embodiments can be configured to associate an unlicensed radio frequency band permission level with each radio bearer carrying data for uplink transmission. In some embodiments, the unlicensed radio frequency band permission level associated with a radio bearer can be defined based at least in part on and/or can be otherwise correlated with a quality of service level associated with the radio bearer. Thus, for example, a radio bearer carrying data that is particularly sensitive to delay and has high throughput requirements can be assigned an unlicensed radio frequency band permission level forbidding transmission over an unlicensed radio frequency band component carrier, while a radio bearer carrying best effort data can be assigned an unlicensed radio frequency band permission level allowing data for the radio bearer to be freely transmitted over an unlicensed radio frequency band component carrier. The wireless communication device of such example embodiments can be further configured to multiplex uplink traffic for active radio bearers on available component carrier resources, including any available unlicensed radio frequency band component carriers, based at lest in part on the unlicensed radio frequency band permission levels associated with the active radio bearers. Accordingly, as described further herein, usage can be made of available unlicensed radio frequency band component carrier resources to increase uplink throughput while satisfying quality of service requirements for radio bearers that carry data that can be sensitive to interference that may occur in unlicensed radio frequency spectrum.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1:
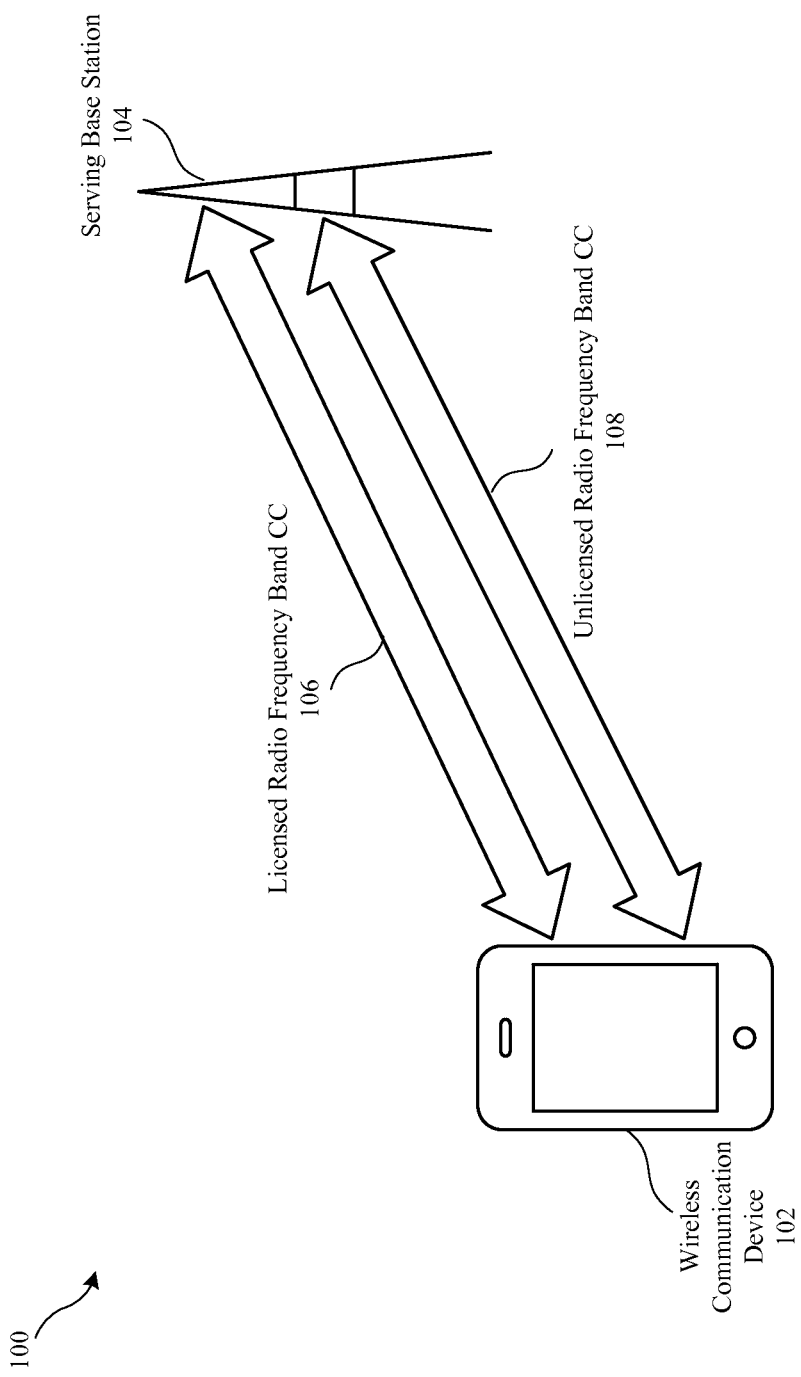
FIG. 1 illustrates a wireless communication system implementing carrier aggregation in both a licensed radio frequency band and an unlicensed radio frequency band in accordance with some example embodiments.

FIG. 1 illustrates a wireless communication system 100 implementing carrier aggregation in both a licensed radio frequency band and an unlicensed radio frequency band in accordance with some example embodiments. In this regard, FIG. 1 illustrates a wireless cellular access network including a wireless communication device 102 and a serving base station 104, which can provide network access to the wireless communication device 102 via multiple component carriers. By way of non-limiting example, the wireless communication device 102 can be a cellular phone, such as a smart phone device, a tablet computing device, a laptop computing device, or other computing device configured to access a cellular and/or other wireless network via a serving base station 104. When used with certain RATs, such as LTE, the wireless communication device 102 can be characterized as user equipment (UE). The serving base station 104 can be any cellular base station, such as an evolved node B (eNB), node B, base transceiver station (BTS), and/or any other type of base station.

The wireless cellular access network of the wireless communication system 100 can be a carrier aggregation capable wireless network implementing any RAT that can support carrier aggregation techniques, including, by way of non-limiting example, LTE-A (e.g., LTE Release 10 and beyond), and/or other present or future developed carrier aggregation capable LTE RAT. It will be appreciated, however, that the embodiments disclosed herein are not limited to application within LTE systems, and can be applied to any present or future-developed RAT supporting carrier aggregation. Further, it will be appreciated that some example embodiments can be applied to non-cellular wireless RATs in which carrier aggregation techniques can be implemented. Thus, for example, it will be appreciated that a wireless network access point in accordance with any such RAT can be substituted for and/or used in addition to the serving base station 104 within the scope of the disclosure. Further, it will be appreciated that where various embodiments are discussed by way of example as being applied to LTE and/or another cellular RAT, such examples are provided as non-limiting examples of the applications of some example embodiments and the techniques can be applied mutatis mutandis to another RAT using carrier aggregation techniques within the scope of the disclosure.

When carrier aggregation is activated on the wireless communication device 102, the wireless communication device 102 can use multiple component carriers to support uplink and/or downlink communication between the wireless communication device 102 and a serving cellular wireless network (e.g., between the wireless communication device 102 and serving cells that provide cellular service to the wireless communication device 102). Each component carrier used in carrier aggregation can be centered at different radio frequency values within a common radio frequency band (e.g., intra-radio frequency band) or across two or more separate radio frequency bands (e.g., inter-radio frequency band). The component carriers can include two or more component carriers in contiguous radio frequency bands and/or two or more component carriers in non-contiguous radio frequency bands. The separate radio frequency bands can include two or more licensed radio frequency bands or a combination of both one or more licensed radio frequency bands and one or more unlicensed radio frequency bands. In some embodiments, communication via a primary component carrier used for carrier aggregation can be within a licensed radio frequency band, and communication via a secondary component carrier used for carrier aggregation can be within an unlicensed radio frequency band.

Two component carriers, the licensed radio frequency band component carrier 106 and the unlicensed radio frequency band component carrier 108, are illustrated by way of example in FIG. 1. The licensed radio frequency band component carrier 106 can use a licensed radio frequency band that can be licensed, such as by the Federal Communications Commission (FCC) and/or other regulatory authority commissioned with regulating radio frequency spectrum usage to a network operator. Accordingly, the licensed radio frequency band component carrier 106 may not be required to coexist with other wireless technologies in the licensed radio frequency band. The unlicensed radio frequency band component carrier 108 can use an unlicensed radio frequency band, such as the 2.4 GHz and/or 5 GHz radio frequency band and/or other ISM radio frequency band that can be freely used by multiple wireless technologies. The unlicensed radio frequency band that can be used by the unlicensed radio frequency band component carrier 108 can be shared with other wireless devices, which can use non-cellular RATs, such as Wi-Fi, Bluetooth, and/or other wireless communications technologies that can be used for communication in unlicensed radio frequency bands. As such, the quality of service offered by the unlicensed radio frequency band component carrier 108 can be lower than that offered by the licensed radio frequency band component carrier 106 due to interference from competing uses of the unlicensed radio frequency spectrum. Component carriers that operate in the licensed radio frequency spectrum and the unlicensed radio frequency spectrum can operate using any of the following combinations of frequency division duplexing (FDD) and time division duplexing (TDD): FDD/FDD, TDD/TDD, FDD/TDD, and TDD/FDD.

It will be appreciated that as the classification of radio frequency bands as licensed or unlicensed can be based on a licensing regime implemented by a government authority, such as the FCC, and/or other regulatory authority, the radio frequency bands that are unlicensed can vary from country to country, or from region to region. As such, an unlicensed radio frequency band that can be used to support the unlicensed radio frequency band component carrier 108 in a first country/region can be a licensed radio frequency band in a second country/region such that another radio frequency band can be used to support the unlicensed radio frequency band component carrier 108 in a second country/region.

In embodiments in which the wireless cellular access network of the system 100 uses an LTE RAT supporting carrier aggregation, such as LTE-A, the licensed radio frequency band component carrier 106 can be an LTE component carrier and the unlicensed radio frequency band component carrier 108 can be an LTE-U component carrier (which can also be referred to as an LTE Assisted Access component carrier). In this regard, the wireless communication device 102 of some example embodiments can be an LTE-U capable wireless communication device that can be capable of using a mixture of LTE component carriers (e.g., in a licensed radio frequency band) and LTE-U component carriers (e.g., in an unlicensed radio frequency band).

While two component carriers are illustrated by way of example in FIG. 1, it will be appreciated that in some instances in which carrier aggregation is activated, the wireless communication device 102 can use three or more component carriers. For example, present LTE specifications allow for up to five component carriers to be used simultaneously, for a maximum of 100 megahertz (MHz) of aggregated radio frequency bandwidth (e.g., up to 20 MHz radio frequency bandwidth can be provided by each individual component carrier). As such, it will be appreciated that one or more licensed radio frequency band component carriers in addition to the licensed radio frequency band component carrier 106 and/or one or more unlicensed radio frequency band component carriers in addition to the unlicensed radio frequency band component carrier 108 can be used by the wireless communication device 102 in some example embodiments.

Each component carrier used by the wireless communication device 102 can correspond to a separate cell. A cell associated with the primary component carrier can be characterized as the primary cell, while a cell associated with a secondary component carrier can be characterized as a secondary cell. Both primary cells and secondary cells can be characterized as serving cells, and thus can also be referred to as primary serving cells and secondary serving cells respectively. For example, in embodiments in which the licensed radio frequency band component carrier 106 is the primary component carrier, the licensed radio frequency band component carrier 106 can correspond to the primary serving cell, and the unlicensed radio frequency band component carrier 108 can correspond to a secondary serving cell. The serving base station 104 and/or other network equipment of the wireless cellular access network can manage a Radio Resource Control (RRC) connection for the wireless communication device 102 and schedule data communication between the wireless cellular access network and the wireless communication device 102 via the primary component carrier, such as specified in LTE/LTE-A wireless communication protocols. In this regard, the primary cell and secondary cell(s) can be managed through a common base station, such as the serving base station 104. Data communication can be supplemented with additional radio frequency bandwidth in the unlicensed radio frequency band over secondary component carriers.

In some instances, such as the example illustrated in FIG. 1 and the example illustrated in and described below with respect to FIG. 2B, each component carrier used by the wireless communication device 102 can be supported by a single base station, such as the serving base station 104. In this regard, the serving base station 104 can, in some example embodiments, support multiple co-located cells. In some embodiments, the co-located cells can have varying areas of coverage.

Figure 2A:
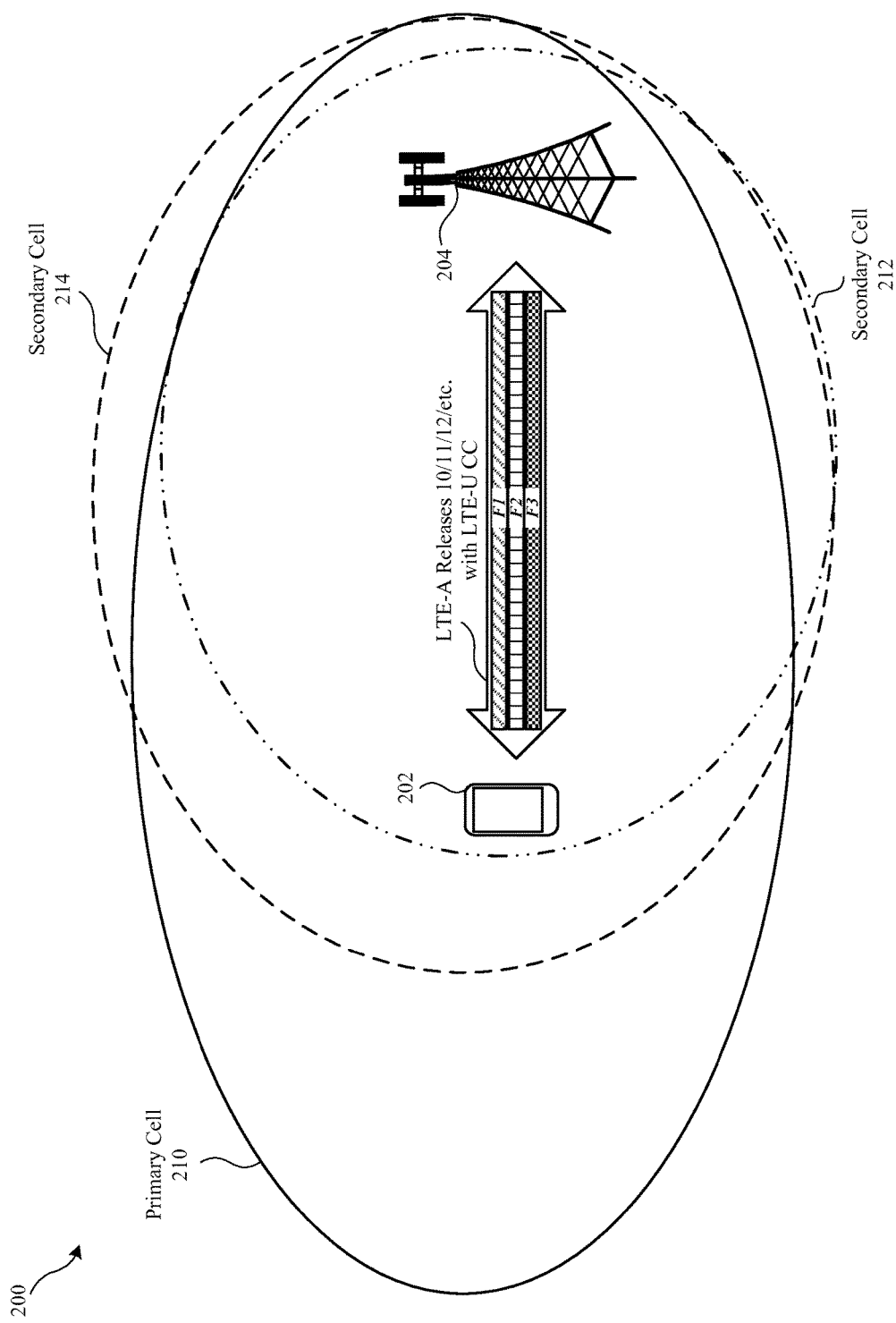
FIGS. 2A and 2B illustrate example LTE-A communication systems including a wireless communication device in communication with a primary cell and one or more secondary cells in accordance with various example embodiments.
Figure 2B:
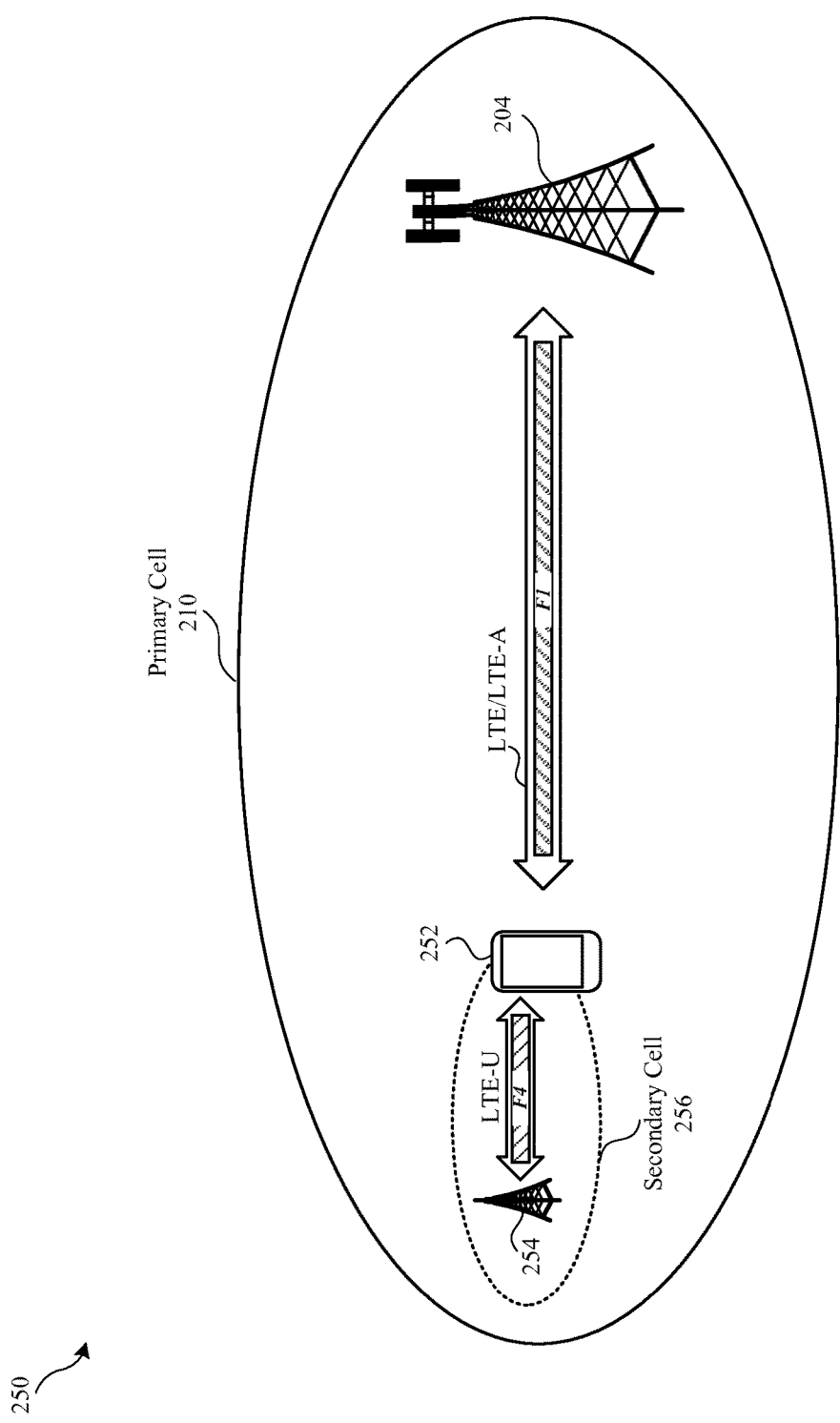

In some instances, such as the example illustrated in and described with respect to FIG. 2B, one or more component carriers that can be used by the wireless communication device 102 can be supported by one or more further base stations that can be disposed within the wireless cellular access network. Thus, in some embodiments, the unlicensed radio frequency band CC 108 can be provided by a second base station beyond the serving base station 104. Additionally or alternatively, in some embodiments, the system 100 can include one or more further base stations supporting one or more additional component carriers, which can include licensed radio frequency band component carriers and/or unlicensed radio frequency band component carriers. In some embodiments, the system 100 can include a heterogeneous wireless network (HetNet) deployment in which a wireless network operator can deploy one or more "small" cells (e.g., a micro-cell, nano-cell, femto-cell, and/or the like), which can operate in an unlicensed radio frequency band(s) over a relatively limited geographic coverage area, which can be significantly smaller than the coverage area of a macro-cell of a cellular wireless access network.

FIG. 2A illustrates an example LTE-A communication system 200 including a wireless communication device 202 in communication with a primary cell 210 and secondary cells 212 and 214. In this regard, FIG. 2A illustrates an example embodiment of the system 100 in which an LTE-A RAT, such as one or more of LTE Releases 10, 11, 12, and beyond, can be used, and multiple serving cells can be provided by a single serving base station. As such, the wireless communication device 202 can comprise an embodiment of the wireless communication device 102 that is LTE-A compliant and LTE-U compliant. The eNB 204 can comprise an embodiment of the serving base station 104.

As illustrated in FIG. 2A, the serving cells of the wireless communication device 202 (e.g., the primary cell 210 and secondary cells 212 and 214) can have overlapping coverage areas, including at the location of the wireless communication device 202, but do not necessarily cover a coextensive geographic area.

In the example of FIG. 2A, the eNB 204 can have radio frequency transmission and reception equipment for providing radio frequency signal coverage for the wireless communication device 202 (e.g., in the uplink and/or downlink) via multiple distinct radio frequency resources (also referred to as carriers or in the context of carrier aggregation as component carriers), such as, by way of example, F1, F2, and F3. The three carriers in the example of FIG. 2A can be used as individual component carriers for communication that can be provided to the wireless communication device 202 in aggregate to offer higher communication radio frequency bandwidth and/or throughput than can be possible by using only a single component carrier. From the perspective of the wireless communication device 202, the component carrier radio frequency resource F1 can be associated with the primary cell 210, the component carrier radio frequency resource F2 can be associated with the secondary cell 212, and the component carrier radio frequency resource F3 can be associated with the secondary cell 214. One or both of the radio frequency resources F2 and F3 can be an unlicensed radio frequency band resource such that one or both of the component carrier radio frequency resource F2 and the component carrier radio frequency resource F3 can be an LTE-U component carrier.

FIG. 2B illustrates an example LTE-A communication system 250 including a wireless communication device 252 in communication with a primary cell 210 and a secondary cell 256, which can be a small cell. In this regard, FIG. 2B illustrates another example embodiment of the system 100 in which an LTE-A RAT, such as one or more of LTE Releases 10, 11, 12, and beyond can be used, and multiple serving cells can be provided by a single serving base station. The example system 250 can comprise a HetNet including the eNB 204 and a small cell eNB 254. The wireless communication device 252 can accordingly comprise an embodiment of the wireless communication device 102 that is LTE-A compliant and LTE-U compliant.

The wireless communication device 252 can be in communication with the primary cell 210 via a primary component carrier at radio frequency F1 (e.g., in accordance with an LTE/LTE-A wireless communication protocol) and with the secondary cell 256 via a secondary component carrier at radio frequency F4. The radio frequency F1 can be in a licensed radio frequency band. The wireless network provider can operate the small cell eNB 254 using a carrier in an unlicensed radio frequency band. F4 can accordingly provide an LTE-U component carrier, such that the wireless communication device 252 can be serviced in the primary cell 210 via a licensed radio frequency band LTE component carrier and in the secondary cell 256 via an unlicensed radio frequency band LTE-U component carrier.

Figure 3:
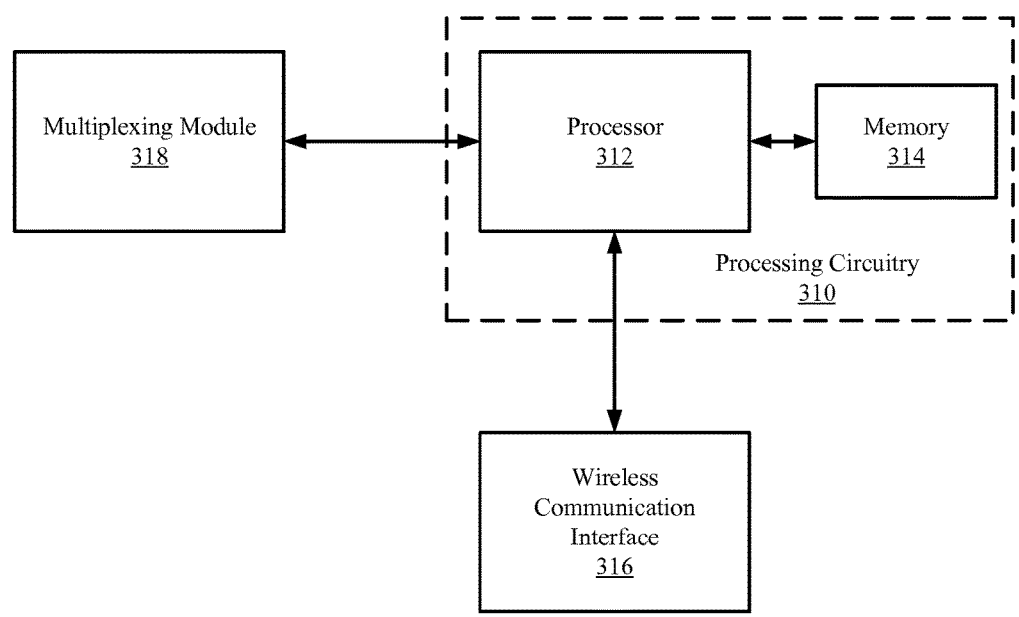
FIG. 3 illustrates a block diagram of an apparatus that can be implemented on a wireless communication device in accordance with some example embodiments.

FIG. 3 illustrates a block diagram of an apparatus 300 that can be implemented on a wireless communication device, such as wireless communication device 102, in accordance with some example embodiments. In this regard, when implemented on a computing device, such as wireless communication device 102, apparatus 300 can enable the computing device to operate within a wireless communication system, such as one or more of the systems 100, 200, and 250, in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments.

In some embodiments, the apparatus 300 or one or more portions or components thereof, such as the processing circuitry 310, can include one or more chipsets, each of which can include one or more chips. The processing circuitry 310 and/or one or more further components of the apparatus 300 can therefore, in some instances, be configured to implement an embodiment on a chipset. In some example embodiments in which one or more components of the apparatus 300 are embodied as a chipset, the chipset can be capable of enabling a computing device to operate within a wireless communication system, such as one or more of the systems 100, 200, and 250, when implemented on or otherwise operably coupled to the computing device. In some example embodiments, the apparatus 300 can include a cellular radio frequency baseband chipset, which can be configured to enable a computing device, such as wireless communication device 102, to operate as a carrier aggregation capable device on one or more cellular networks.

In some example embodiments, the processing circuitry 310 can include a processor 312 and, in some embodiments, such as that illustrated in FIG. 3, can further include memory 314. The processing circuitry 310 can be in communication with or otherwise control the wireless communication interface 316 and/or the multiplexing module 318.

The processor 312 can be embodied in a variety of forms. For example, the processor 312 can be embodied as various hardware-based processing means such as a microprocessor, a co-processor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, the wireless communication interface 316, and the multiplexing module 318 via one or more busses for passing information among components of the apparatus 300.

The apparatus 300 can further include a wireless communication interface 316. The wireless communication interface 316 can enable the apparatus 300 to send wireless signals to and receive signals from one or more wireless networks. Thus, for example, when implemented on wireless communication device 102, the wireless communication interface 316 can be configured to support a connection to one or more base stations, such as serving base station 104, eNB 204, and/or small cell eNB 254, via one or more component carriers. The wireless communication interface 316 can accordingly include one or more transceivers and supporting hardware and/or software for enabling communication via one or more component carriers in accordance with any carrier aggregation capable RAT.

In some embodiments, the wireless communication interface 316 can include two or more radio frequency (RF) chains to support carrier aggregation. For example, the wireless communication interface 316 of some example embodiments can comprise a number of RF chains equivalent to a maximum number of concurrent component carriers that can be supported by the wireless communication device 102. For example, in some embodiments in which the wireless communication device 102 can support aggregation of up to five component carriers, the wireless communication interface 316 can include five RF chains. An example transceiver architecture comprising a plurality of RF chains that can provide at least a portion of the wireless communication interface 316 in accordance with some such embodiments is illustrated in and described below with respect to FIG. 4.

The wireless communication interface 316 can additionally include one or more transceivers and/or other radio components to support one or more further wireless communication technologies that can be implemented on a wireless communication device 102. For example, the wireless communication interface 316 can include radio components for supporting communication via Wi-Fi, Bluetooth, and/or other ISM radio frequency band communications technologies.

The apparatus 300 can further include multiplexing module 318. The multiplexing module 318 can be embodied as various means, such as circuitry, hardware, a computer program product comprising computer readable program instructions stored on a non-transitory computer readable medium (for example, the memory 314) and executed by a processing device (for example, the processor 312), or some combination thereof. In some embodiments, the processor 312 (or the processing circuitry 310) can include or otherwise control the multiplexing module 318. The multiplexing module 318 can be configured to perform prioritization and multiplexing of uplink traffic for active radio bearers based at least in part on unlicensed radio frequency band permission levels associated with the radio bearers in accordance with various example embodiments disclosed herein. In some example embodiments, at least a portion of the functionality of the multiplexing module 318 can be performed and/or otherwise implemented at a media access control (MAC) layer and/or a radio link control (RLC) layer of the wireless communication device 102.

Figure 4:
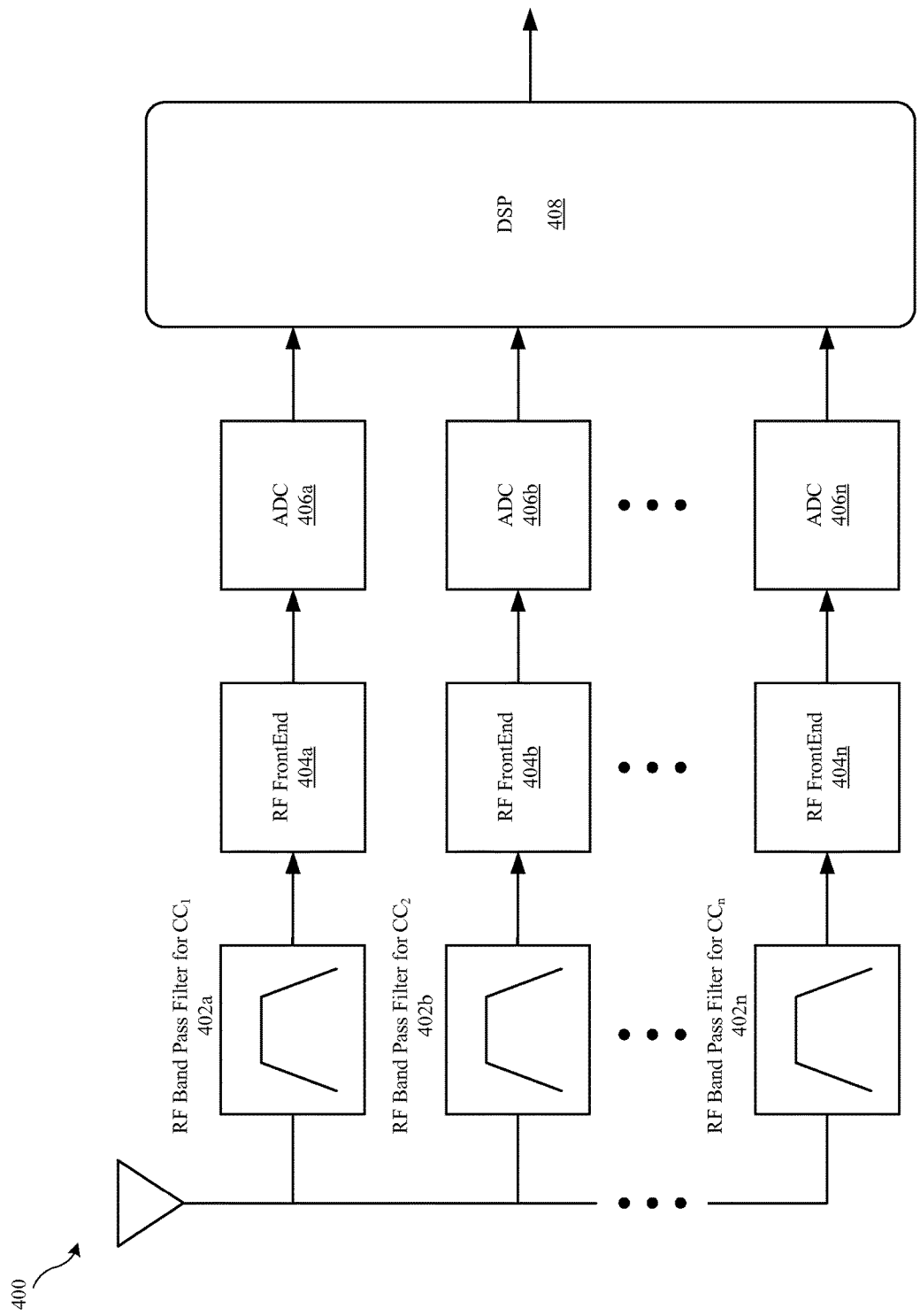
FIG. 4 illustrates an example transceiver architecture that can be implemented as part of a wireless communication interface of a wireless communication device to support carrier aggregation in accordance with some example embodiments.

FIG. 4 illustrates a diagram 400 of an example transceiver architecture that can be implemented on a wireless communication interface, such as wireless communication interface 316, of a wireless communication device, such as wireless communication device 102, to support carrier aggregation in accordance with some example embodiments. As illustrated in FIG. 4, a transceiver architecture on a carrier aggregation capable wireless communication device, in accordance with some example embodiments, can include multiple RF chains, each which can be used to support a respective component carrier. For example, a first RF chain can be used for $CC_1$, a second RF chain can be used for $CC_2$, ..., and an $n^{th}$ RF chain can be used for $CC_n$. In this regard, a transceiver architecture, in accordance with some example embodiments, can include at least a number of RF chains corresponding to a number of component carriers that can be aggregated in accordance with device and/or network specifications. For example, some LTE-A systems support aggregation of up to five component carriers, and a transceiver configuration on a device configured to operate on such LTE-A systems can include at least five RF chains to support the use of five component carriers. It will be appreciated, however, that a carrier aggregation capable wireless communication device having a wireless communication interface comprising the transceiver architecture of FIG. 4, in accordance with various example embodiments, can include any number, e.g., n≥2, RF chains.

In the example architecture illustrated in FIG. 4, each RF chain can include an RF band pass filter 402, an RF front end 404, and an analog-to-digital converter (ADC) 406. In this regard, the first RF chain can include the RF band pass filter 402a, RF front end 404a, and ADC 406a; the second RF chain can include the RF band pass filter 402b, RF front end 404b, and ADC 406b; and the nth RF chain can include the RF band pass filter 402n, RF front end 404n, and ADC 406n. It will be appreciated, however, that the RF chain architecture illustrated in FIG. 4 is illustrated by way of example, and not by way of limitation. In this regard, an RF chain in accordance with various example embodiments can include additional and/or alternative elements to those illustrated in FIG. 4. In the example architecture of FIG. 4, each RF chain can feed into a digital signal processor (DSP) 408, which can provide DSP services for each of the RF chains.

Figure 5:
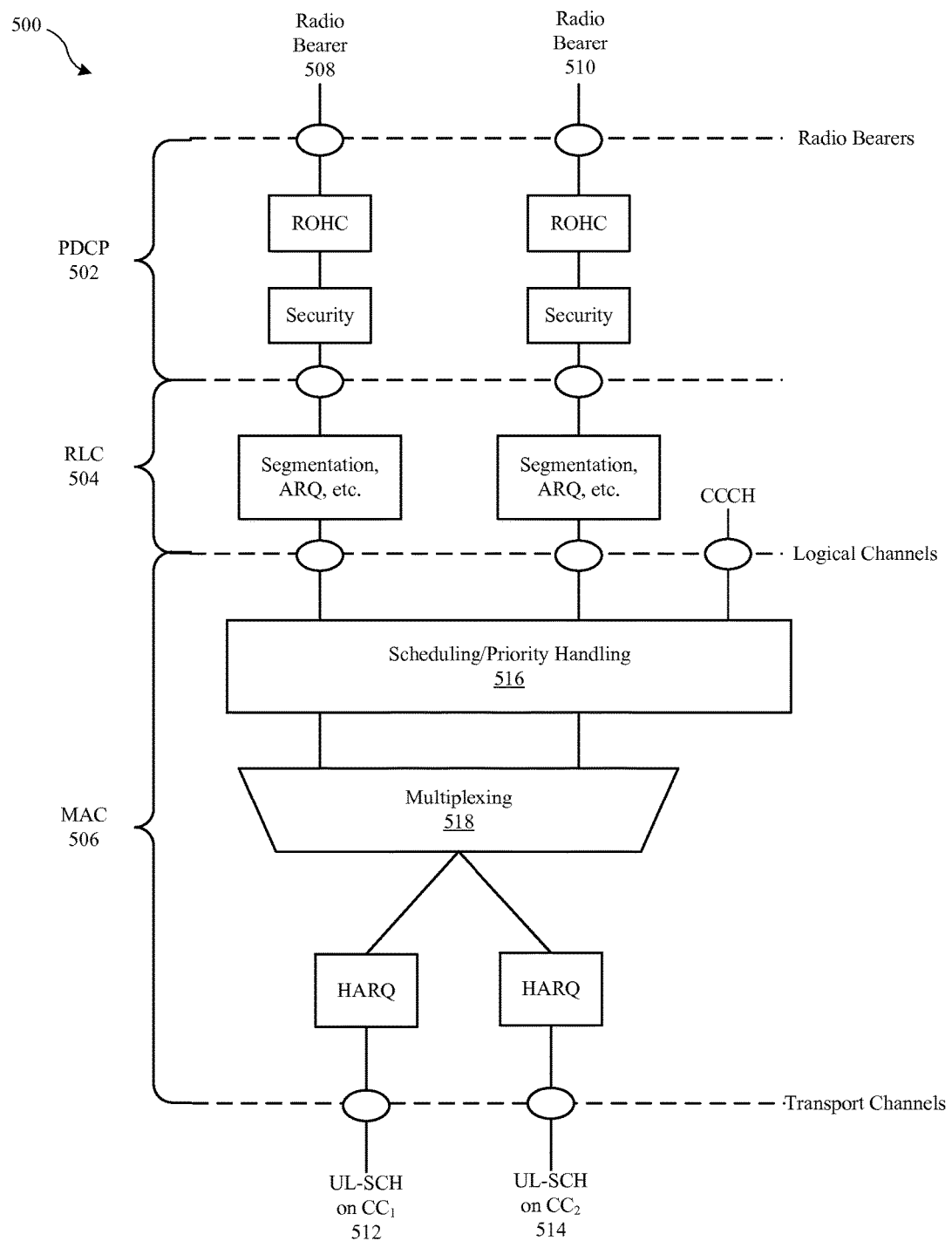
FIG. 5 illustrates an architecture for supporting the multiplexing of radio bearers on a plurality of component carriers in accordance with some example embodiments.

FIG. 5 illustrates a diagram 500 of an architecture for supporting multiplexing of radio bearers on multiple component carriers that can be implemented by a wireless communication device, such as wireless communication device 102, in accordance with some example embodiments. As illustrated in FIG. 5, a wireless communication device can include multiple logical layers, such as packet data convergence protocol (PDCP) layer 502, radio link control (RLC) layer 504, and MAC layer 506. By way of example, FIG. 5 illustrates multiplexing of uplink data for two radio bearers, a first radio bearer 508 and a second radio bearer 510, on two component carriers, $CC_1$ 512 and $CC_2$ 514. It will be appreciated, however, that the architecture of FIG. 5 is extensible to handle additional radio bearers and/or additional component carriers.

The PDCP layer 502 can provide header compression services, such as robust header compression (ROHC), and security services for uplink data generated for each radio bearer. Uplink data for each bearer can then be passed to the RLC layer 504, which can perform segmentation of the data into RLC packet data units (PDUs), which can be provided to and/or otherwise accessed by the MAC layer 506 for uplink transmission. The RLC layer 504 can also perform further services, such as automatic repeat request (ARQ) services for retransmitting PDUs that are not properly received by the network when operating in acknowledged mode (AM).

The MAC layer 506 can perform a scheduling and priority handling function 516 for RLC PDUs for the first radio bearer 508 and the second radio bearer 510. Scheduling and priority handling functions 516 can, for example, include prioritizing uplink data for a given transmission time interval (TTI) based at least in part on any prioritized bit rate(s) (PBR) that may be associated with the radio bearers, on quality of service level(s) that can be associated with the radio bearers, on one or more scheduling grants for the component carriers for the TTI, and/or other factors. Examples of prioritization of data for a plurality of radio bearers based on such factors are illustrated in and described below with respect to FIGS. 7 and 8. The scheduled and prioritized data can then be multiplexed via the multiplexing function 518 and sent on component carriers $CC_1$ and $CC_2$. In embodiments in which one of the component carriers $CC_1$ 512 and $CC_2$ 514 uses an unlicensed radio frequency band, the first radio bearer 508 and/or the second radio bearer 510 can be assigned respective unlicensed radio frequency band permission levels, and the scheduling/priority handling function 516 and the multiplexing function 518 can be performed based at least in part on the respective unlicensed radio frequency band permission levels of the radio bearers, such as described further herein below with respect to FIGS. 6-9. In some embodiments, the scheduling/priority handling function 516 and the multiplexing function 518 can be performed by and/or under the control of the multiplexing module 318.

Figure 6:
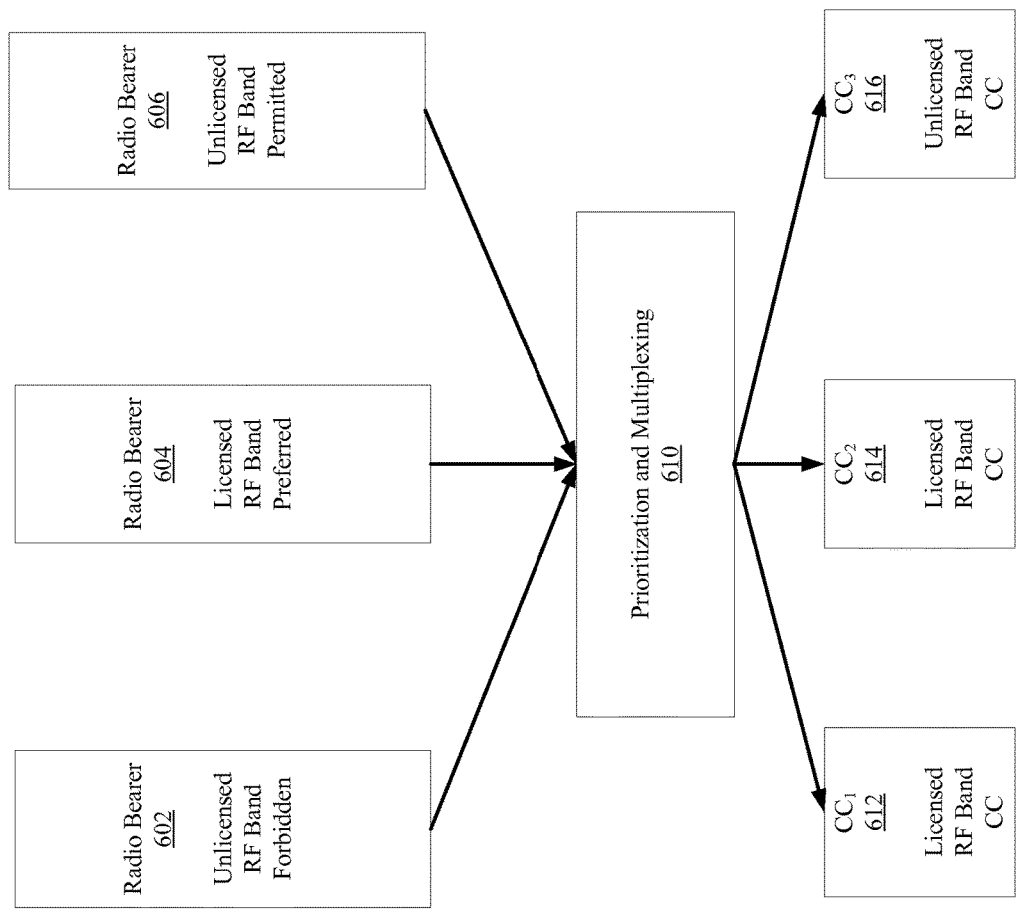
FIG. 6 illustrates prioritization and multiplexing of data for a plurality of radio bearers having various unlicensed radio frequency band permission levels on a plurality of component carrier resources including an unlicensed radio frequency band component carrier in accordance with some example embodiments.

Prioritization and multiplexing of data for a plurality of radio bearers in accordance with some example embodiments will now be discussed with respect to FIG. 6. In accordance with various example embodiments, component carriers available for uplink transmission can be labeled as either a licensed radio frequency band component carrier or an unlicensed radio frequency band component carrier. Thus, for example, in FIG. 6, $CC_1$ 612 can be labeled as a licensed radio frequency band component carrier, $CC_2$ 614 can be labeled as a licensed radio frequency band component carrier, and $CC_3$ 616 can be labeled as an unlicensed radio frequency band component carrier. The available component carriers can additionally be prioritized for transmission. In general, licensed radio frequency band component carriers can be prioritized higher than unlicensed radio frequency band component carriers. For example, in the example of FIG. 6, a priority for the component carriers can be defined as: $CC_1$ 612>$CC_2$ 614>$CC_3$ 616, where the licensed radio frequency band component carrier $CC_1$ 612 has a higher priority than the licensed radio frequency band component carrier $CC_2$ 614, which in turn has a higher priority than the unlicensed radio frequency band component carrier $CC_3$ 616. It will be appreciated that the example of three component carriers in FIG. 6 is provided by way of example, and not by way of limitation. In this regard, the concepts described with respect to FIG. 6 can be applied to any number of component carriers, including any mixture of licensed radio frequency band component carriers and unlicensed radio frequency band component carriers.

To facilitate support for prioritization and multiplexing uplink traffic over a plurality of component carriers including one or more unlicensed radio frequency band component carriers, such as $CC_3$ 616, in accordance with various example embodiments, each uplink radio bearer can be associated with an unlicensed radio frequency band permission level. The unlicensed radio frequency band permission level can define whether and/or under what conditions uplink traffic for a radio bearer can be routed over an unlicensed radio frequency band component carrier. In this regard, different radio bearers can have different required quality of service requirements, such as can be defined based at least in part on a quality of service (QoS) class indicator (QCI), end-to-end transmission requirements, packet loss requirements, delay tolerance, minimum throughput requirements, tolerated packet loss, and/or the like. Depending on the quality of service requirements, some radio bearers can tolerate their uplink data being routed via an unlicensed radio frequency band component carrier, while other radio bearers may not.

For example, some radio bearers, such as radio bearer 602 in FIG. 6, can be associated with an "unlicensed radio frequency band forbidden" permission level, which can also be referred to as "LTE-U forbidden" in instances in which an LTE-U component carrier(s) is used. Uplink traffic for a radio bearer associated with the unlicensed radio frequency band forbidden permission level may not be tolerant of the lower quality of service that can be offered on an unlicensed radio frequency band and therefore cannot be routed over an unlicensed radio frequency band component carrier. For example, a radio bearer carrying data having a low end-to-end delay tolerance (e.g., less than a threshold level of delay tolerance) and a relatively high throughput requirement (e.g., requiring more than a threshold throughput level) can be associated with an unlicensed radio frequency band forbidden permission level. For example, radio bearers used for real time services, such as voice over LTE (VoLTE), real time video, and/or other high quality of service applications can be associated with an unlicensed radio frequency band forbidden permission level.

Some radio bearers, such as radio bearer 604 in FIG. 6, can be associated with a "licensed radio frequency band preferred" permission level, which can be referred to as "LTE preferred" in instances in which an LTE-U component carrier(s) is used. Uplink traffic for a radio bearer associated with the licensed radio frequency band preferred permission level can be routed over a licensed radio frequency band component carrier provided resources are available (e.g., after satisfying unlicensed radio frequency band forbidden bearer data and/or other higher priority data). In some embodiments, however, if there are not any licensed radio frequency band component carrier resources available for a TTI, data for a licensed radio frequency band preferred radio bearer can be routed over an unlicensed radio frequency band component carrier. For example, a radio bearer carrying data that is not as sensitive to delay (e.g., greater than a threshold level of delay tolerance) but still requiring a relatively high throughput requirement (e.g., requiring more than a threshold throughput level) can be associated with a licensed radio frequency band preferred permission level. For example, non-real time streaming video services can be associated with a licensed radio frequency band preferred permission level.

Some radio bearers, such as radio bearer 606 in FIG. 6, can be associated with an "unlicensed radio frequency band permitted" permission level, which can be referred to as "LTE-U permitted" in instances in which an LTE-U component carrier(s) is used. Uplink traffic for a radio bearer associated with the unlicensed radio frequency band permitted permission level can be routed over both licensed radio frequency band component carriers and unlicensed radio frequency band component carriers without any preference, and thus can be routed over an unlicensed radio frequency band component carrier even when one or more licensed radio frequency band component carriers are available. As such, data traffic for licensed radio frequency band preferred permission level radio bearers can be prioritized higher than unlicensed radio frequency band permitted radio bearers, and a PBR for a licensed radio frequency band preferred permission level radio bearer can satisfied via a licensed radio frequency band component carrier before routing unlicensed radio frequency band permitted data over a licensed radio frequency band component carrier for a given TTI. A radio bearer associated with the unlicensed radio frequency band permitted permission level can, for example, carry best effort data, such as general web browsing traffic.

In some embodiments, the wireless communication device 102 (e.g., a multiplexing module 318 that can be associated with the wireless communication device 102) can assign unlicensed radio frequency band permission levels to radio bearers, such as radio bearer 602, radio bearer 604, and radio bearer 606. For example, the wireless communication device 102 of such example embodiments can assign an unlicensed radio frequency band permission level to a radio bearer based at least in part on a QCI and/or other quality of service level that can be associated with the radio bearer. For example, the wireless communication device 102 can maintain a data structure that maps quality of service levels to respective unlicensed radio frequency band permission levels and can use the data structure to assign an unlicensed radio frequency band permission level to a radio bearer based on the quality of service level associated with the radio bearer.

Additionally or alternatively, in some embodiments, the cellular wireless network, with which the wireless communication device 102 is associated, can assign unlicensed radio frequency band permission levels to radio bearers, and the wireless communication device 102 can associate a cellular wireless network assigned unlicensed radio frequency band permission level to a radio bearer. For example, the cellular wireless network can assign a radio bearer with an unlicensed radio frequency band permission level based at least in part on a QCI and/or other quality of service level associated with the radio bearer. The assigned unlicensed radio frequency band permission level can be signaled to the wireless communication device 102, such as during radio bearer setup, during a radio resource control (RRC) configuration procedure, in an RRC connection reconfiguration message, and/or in other control signaling that can occur between the wireless communication device 102 and network elements of the cellular wireless network. In some example embodiments in which the cellular wireless network can assign an unlicensed radio frequency band permission level to a radio bearer, the assignment can be signaled to the wireless communication device 102 via the primary serving cell.

In some embodiments, an association between one or more radio bearers and unlicensed radio frequency band permission levels can be provided through an RRC/RLC layer and/or a non-access stratum (NAS) layer, e.g., based on configurations communicated from one or more network elements, e.g., an eNB and/or a mobile management entity (MME), of the cellular wireless network to the wireless communication device 102 via the RRC/RLC layer and/or the NAS layer. In some embodiments, the wireless communication device 102 can determine an association between one or more radio bearers and unlicensed radio frequency band permission levels based on a set of application requirements, which can co-exist with and/or modify configurations provided by one or more network elements of the cellular wireless network. In some embodiments, the wireless communication device 102 can provide an indication of its capabilities to one or more network elements of the cellular wireless network, e.g., whether or not the wireless communication device 102 supports the use of LTE-U component carriers. In some embodiments, one or more network elements of the cellular wireless network can use information about capabilities of the wireless communication device 102 to determine a set of unlicensed radio frequency band permission levels to associate with radio bearers for the wireless communication device 102. In some embodiments, the one or more network elements provides a set of unlicensed radio frequency band permission levels and/or a set of associations between unlicensed radio frequency band permission levels and a set of radio bearers for a wireless communication device 102 to the wireless communication device 102, e.g., via an RRC/RLC layer and/or a NAS layer. In some embodiments, messages by which network elements of the cellular wireless network can inquire about capabilities of the wireless communication device 102 and/or messages by which the wireless communication device 102 can indicate its capabilities to one or more network elements can be added and/or modified to indicate support for LTE-U communication characteristics, e.g., support for one or more LTE-U component carriers, support for one or more LTE-U unlicensed radio frequency bands, support for one or more LTE-U component carrier frequencies, and/or combinations of these. In some embodiments, one or more network elements of the cellular wireless network can inquire about capabilities of a wireless communication device 102 to support carrier aggregation, e.g., whether the wireless communication device 102 supports communication using one or more combinations of LTE component carriers in licensed radio frequency bands and LTE-U component carriers in unlicensed radio frequency bands. In some embodiments, the wireless communication device 102 can be categorized as belonging to a wireless communication device category type, e.g., an existing and/or new UE category type, which can indicate whether the wireless communication device 102 supports carrier aggregation using a combination of LTE licensed radio frequency band component carriers and LTE-U unlicensed radio frequency band component carriers. For example, the wireless communication device 102, in some embodiments, can be categorized as belonging to a category 9-U, 10-U, 11-U, 12-U, or another #-U type, in accordance with one or more categorizations defined for one or more wireless communication protocols that support LTE-U component carriers.

As illustrated in FIG. 6, the wireless communication device 102 can perform a prioritization and multiplexing function 610 on uplink traffic for the radio bearers. The prioritization and multiplexing function 610 can be performed by the multiplexing module 318, in some embodiments. In some embodiments, the prioritization and multiplexing function 610 can occur as part of the MAC layer 506. The prioritization and multiplexing function 610 can be performed based at least in part on the unlicensed radio frequency band permission levels assigned to the radio bearers. In some example embodiments, the prioritization and multiplexing function 610 can additionally consider any PBRs associated with the radio bearers. In this regard, the prioritization and multiplexing function 610 can be performed to at least satisfy respective minimal packet bit rates for each of the radio bearers.

A MAC PDU size granted for a component carrier (e.g., for a given TTI) can serve as a constraint on the maximum amount of data that can be routed over the component carrier. The MAC PDU size and can also be factored in the performing of the prioritization and multiplexing function 610. In this regard, where possible given any constraints imposed by the unlicensed radio frequency band permission levels of active radio bearers, some example embodiments prioritize and multiplex data to fill up available MAC PDUs for a given TTI. More detailed examples of prioritization and multiplexing in accordance with granted MAC PDU size are illustrated in and described below with respect to the examples of FIGS. 7 and 8.

The PBRs of unlicensed radio frequency band forbidden radio bearers, such as radio bearer 602, can be accorded a highest priority, and the PBRs can be enforced to the total available transmitting resources of a set of licensed radio frequency band component carriers, such as $CC_1$ 612 and $CC_2$ 614. In some embodiments, MAC control elements (CEs) and/or other control signaling can also be assigned (and/or understood to have) an unlicensed radio frequency band forbidden permission level, and thus a set of MAC CDs and/or other control signaling can always be routed over one or more licensed radio frequency band component carriers and not be routed over any unlicensed radio frequency band component carriers.

The PBRs of licensed radio frequency band preferred radio bearers, such as radio bearer 604, can be enforced over any available transmitting resources in a set of available licensed radio frequency band component carrier(s) first (e.g., after satisfying the PBRs of any unlicensed radio frequency band forbidden radio bearers). Any remaining portion of the PBRs of licensed radio frequency band preferred radio bearers can subsequently be satisfied via unlicensed radio frequency band component carriers.

As discussed hereinabove, data for unlicensed radio frequency band permitted bearers, such as radio bearer 606, can be routed over any radio bearer, irrespective of whether the radio bearer is in a licensed RF band or an unlicensed RF band. For example, in some embodiments, data for licensed radio frequency band permitted bearers can be routed over available licensed radio frequency band component carrier resources, and data for unlicensed radio frequency band permitted bearers can be routed over unlicensed radio frequency band component carrier resources, unless there is an available licensed radio frequency band component carrier resource after fulfilling data (or at least the PBRs, if any) for licensed radio frequency band permitted bearers on licensed radio frequency band component carrier resources. In some embodiments, data for a licensed radio frequency band permitted bearer can be routed over unlicensed radio frequency band component carrier resources first before using any licensed radio frequency band component carrier resources.

Figure 7:
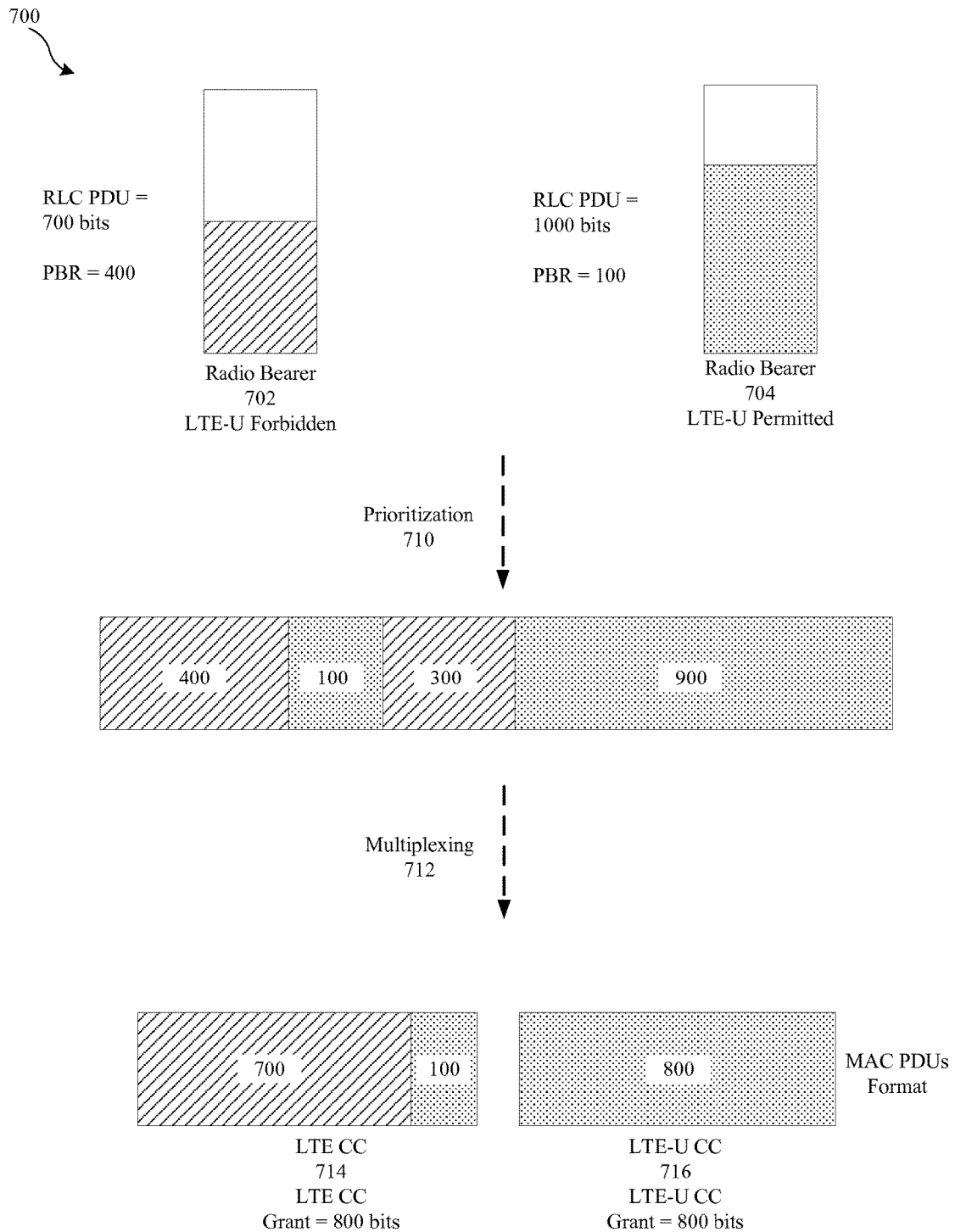
FIG. 7 illustrates a conceptual example of prioritization and multiplexing of data for a plurality of radio bearers on an LTE component carrier and an LTE-U component carrier in accordance with some example embodiments.

FIG. 7 illustrates a diagram 700 of a conceptual example of prioritization and multiplexing of data for a first radio bearer 702 and a second radio bearer 704 to an LTE component carrier 714 and an LTE-U component carrier 716, for an example TTI, in accordance with some embodiments. The first radio bearer 702 can be associated with an LTE-U forbidden permission level, and the second radio bearer 704 can be associated with an LTE-U permitted permission level. The RLC PDU available to the MAC layer for the first radio bearer 702, for the example TTI, can comprise 700 bits of data, and the PBR of the first radio bearer 702 can be 400 bits. The RLC PDU available to the MAC layer for the second radio bearer 704, for the example TTI, can comprise 1000 bits of data, and the PBR of the second radio bearer 704 can be 100 bits.

Prioritization 710 can be performed (e.g., by the multiplexing module 318) for the available RLC PDU data for the first radio bearer 702 and second radio bearer 704 based at least in part on the respective unlicensed radio frequency band permission levels and PBRs for the radio bearers. In this regard, as the first radio bearer 702 is an "LTE-U forbidden" radio bearer, 400 bits of data for the first radio bearer 702 can be prioritized highest in order to satisfy the PBR of the first radio bearer 702. 100 bits of data for the second radio bearer 704 can be accorded the second highest priority so as to satisfy the PBR of the second radio bearer 704. The remaining 300 bits of available RLC PDU data for the first radio bearer 702 can be accorded the third highest priority, followed by the remaining 900 bits of available RLC PDU data for the second radio bearer 704.

In the example of FIG. 7, an 800 bit MAC PDU grant is provided to each of the LTE component carrier 714 and the LTE-U component carrier 716, for a total grant of 1600 bits. Multiplexing 712 can be performed (e.g., by the multiplexing module 318) based at least in part on the results of the prioritization 710 as well as based on the unlicensed radio frequency band permission levels associated with the first radio bearer 702 and second radio bearer 704 within the constraints of the individual MAC PDU size grants. Thus, for example, the PRBs for both radio bearers can be included in the MAC PDU for the LTE component carrier 714, occupying 500 of the 800 bits of its MAC PDU. As the remaining 300 bits of available RLC PDU data for the first radio bearer 702 has a higher priority than the remaining 900 bits of available RLC PDU data for the second radio bearer 704 and cannot be routed over the LTE-U component carrier 716, the remaining 300 bits of available RLC PDU data for the first radio bearer 702 can also be included in the MAC PDU for the LTE component carrier 714. 800 of the remaining 900 bits of available RLC PDU data for the second radio bearer 704 can then be used to fill the unused capacity of the 800 bit MAC PDU for the LTE-U component carrier 716.

Figure 8:
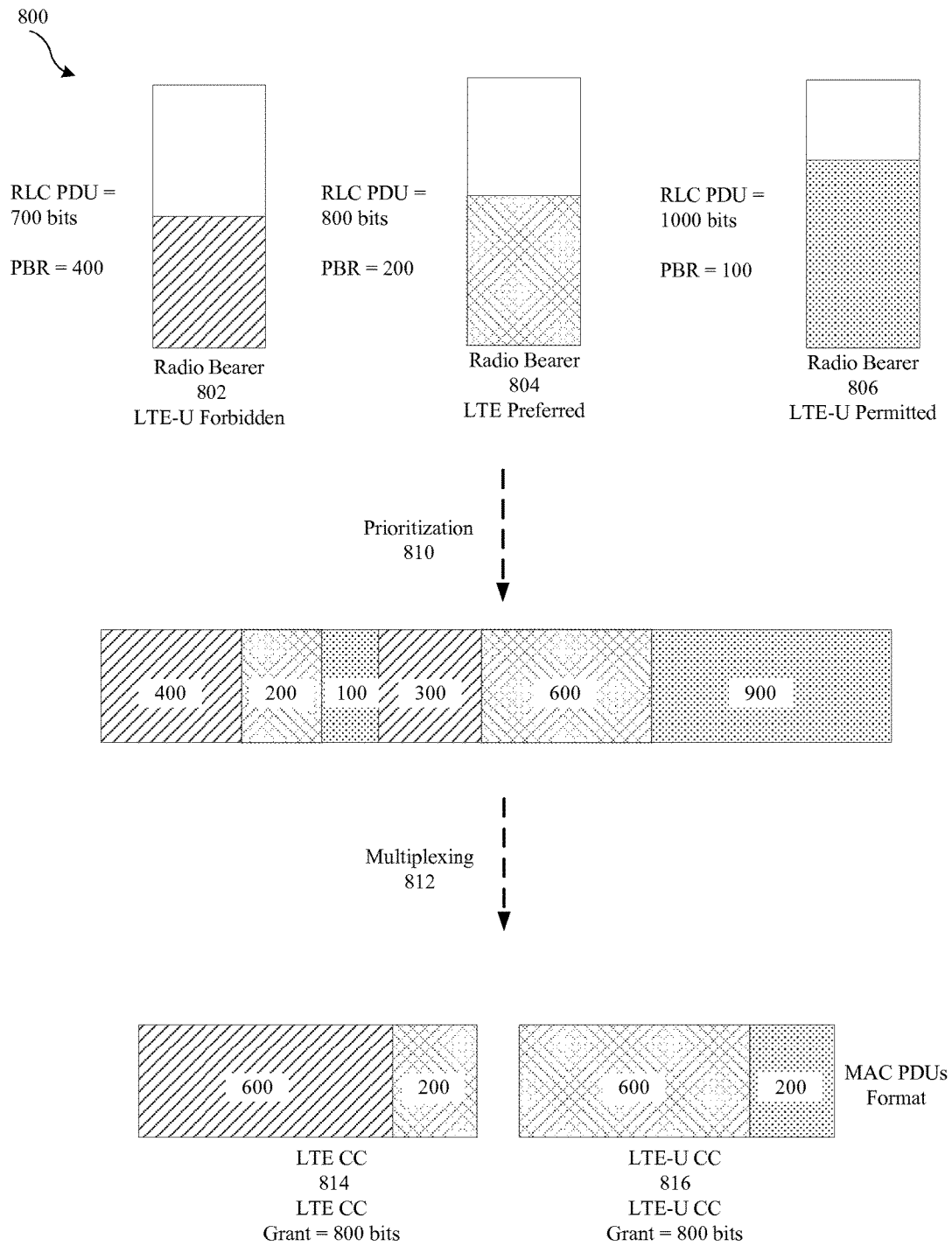
FIG. 8 illustrates another conceptual example of prioritization and multiplexing of data for a plurality of radio bearers on an LTE component carrier and an LTE-U component carrier in accordance with some example embodiments.

FIG. 8 illustrates a diagram 800 of another conceptual example of prioritization and multiplexing of data for a plurality of radio bearers to an LTE component carrier 814 and an LTE-U component carrier 816, for an example TTI. In the example of FIG. 8, a first radio bearer 802 can be associated with an LTE-U forbidden permission level. The RLC PDU available to the MAC layer for the first radio bearer 802, for the example TTI, can comprise 700 bits of data, and the PBR of the first radio bearer 802 can be 400 bits. A second radio bearer 804 can be associated with an LTE preferred permission level. The RLC PDU available to the MAC layer for the second radio bearer 804, for the example TTI, can comprise 800 bits of data, and the PBR of the second radio bearer 804 can be 200 bits. A third radio bearer 806 can be associated with an LTE-U permitted permission level. The RLC PDU available to the MAC layer for the third radio bearer 806, for the example TTI, can comprise 1000 bits of data, and the PBR of the third radio bearer 806 can be 100 bits.

Prioritization 810 can be performed (e.g., by the multiplexing module 318) for the available RLC PDU data for the first radio bearer 802, the second radio bearer 804, and the third radio bearer 806 based at least in part on the respective unlicensed radio frequency band permission levels and PBRs for the radio bearers. In this regard, as the first radio bearer 802 is an "LTE-U forbidden" radio bearer, 400 bits of data for the first radio bearer 802 can be prioritized highest, in order to satisfy the PBR of the first radio bearer 802. In general, data for the second radio bearer 804 can be prioritized higher than data for the third radio bearer 806, as the second radio bearer 804 is an "LTE preferred" radio bearer and the third radio bearer 806 is an "LTE-U permitted" radio bearer. As such, 200 bits to satisfy the PBR of the second radio bearer 804 can be accorded the second highest priority, and 100 bits to satisfy the PBR of the third radio bearer 806 can be accorded the third highest priority. The remaining 300 bits of available PDU data for the first radio bearer 802 can then be accorded the fourth highest priority, followed by the remaining 600 bits of available PDU data for the second radio bearer 804, and finally the remaining 900 bits of available RLC PDU data for the third radio bearer 806.

In the example of FIG. 8, an 800 bit MAC PDU grant is provided for each of the LTE component carrier 814 and the LTE-U component carrier 816, for a total grant of 1600 bits. Multiplexing 812 can be performed (e.g., by the multiplexing module 318) based at least in part on the results of the prioritization 810 as well as the unlicensed radio frequency band permission levels associated with radio bearer 802, radio bearer 804, and radio bearer 806 within the constraints of the MAC PDU size grants. Thus, for example, 400 bits to satisfy the PBR of the first radio bearer 802 can be included in the MAC PDU for the LTE component carrier 814, as that data cannot be transmitted over an LTE-U component carrier. 200 bits to satisfy the PBR of the second radio bearer 804 can also be included in the MAC PDU for the LTE component carrier 814, as the second radio bearer 804 is associated with an LTE preferred permission level. As the 100 bit PBR of the third radio bearer 806 can be freely satisfied on the LTE-U component carrier 816, and data for the first radio bearer 802 is forbidden from being transmitted over an LTE-U component carrier, the remaining 200 bits of space in the MAC PDU for the LTE component carrier 814 can be filled with an additional 200 bits of data for the first radio bearer 802, (e.g., resulting in a total of 600 bits from the first radio bearer 802).

The 100 bits of data for the third radio bearer 806, needed to satisfy the PBR of the third radio bearer 806, can be included in the MAC PDU for the LTE-U component carrier 816. As the 600 bits of remaining RLC PDU data for the second radio bearer 804 has a higher priority than the remaining 900 bits of RLC PDU data for the third radio bearer 806 after all PBRs have been satisfied, the remaining 600 bits of RLC PDU data for the second radio bearer 804 can also be included in the MAC PDU for the LTE-U component carrier 816, leaving room for an additional 100 bits (e.g., 200 bits total) of RLC PDU data for the third radio bearer 806.

It will be appreciated that the techniques illustrated and described with respect to the examples of FIGS. 7 and 8 can be applied mutatis mutandis to any number of radio bearers having various associated unlicensed radio frequency band permission levels and/or to any number of component carriers, including various numbers of licensed radio frequency band component carriers and/or unlicensed radio frequency band component carriers, on which uplink data can be multiplexed. It will be further appreciated that the techniques illustrated in and described with respect to the examples of FIGS. 7 and 8 can also be applied when using carrier aggregation capable RATs other than LTE.

Figure 9:
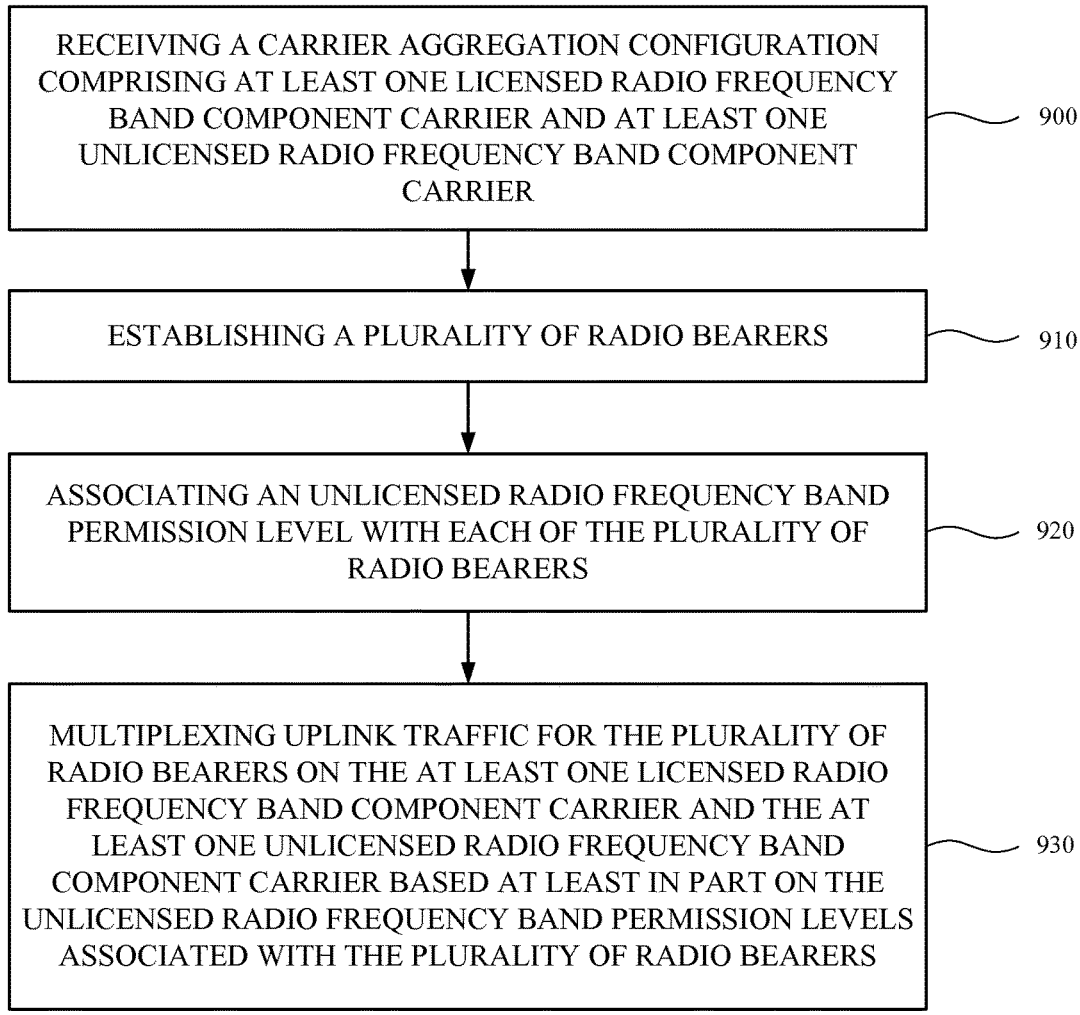
FIG. 9 illustrates a flowchart according to an example method for utilizing an unlicensed radio frequency band component carrier for uplink transmission in accordance with some example embodiments.

FIG. 9 illustrates a flowchart according to an example method for utilizing an unlicensed radio frequency band component carrier for uplink transmission in accordance with some example embodiments. In this regard, FIG. 9 illustrates operations that can be performed by a wireless communication device, such as wireless communication device 102, in accordance with some example embodiments. One or more of processing circuitry 310, processor 312, memory 314, wireless communication interface 316, or multiplexing module 318 can, for example, provide means for performing one or more of the operations illustrated in and described with respect to FIG. 9.

Operation 900 can include the wireless communication device 102 receiving a carrier aggregation configuration that includes at least one licensed radio frequency band component carrier (e.g., licensed radio frequency band component carrier 106) and at least one unlicensed radio frequency band component carrier (e.g., unlicensed radio frequency band component carrier 108).

Operation 910 can include the wireless communication device 102 establishing a plurality of radio bearers with a wireless network. The radio bearers can be established contemporaneously and/or can be established over a period of time, such as in response to activation of various services that the radio bearers may support.

Operation 920 can include associating an unlicensed radio frequency band permission level with each of the radio bearers. For example, an unlicensed radio frequency band permission level selected from: (i) unlicensed radio frequency band forbidden, (ii) licensed radio frequency band preferred, and (iii) unlicensed radio frequency band permitted can be associated with each respective radio bearer. The selection of the unlicensed radio frequency band permission level for the radio bearers can be based on quality of service requirements associated with data carried by the radio bearer. In some embodiments, the wireless communication device 102 can autonomously assign one or more of the unlicensed radio frequency band permission levels, such as based on QCIs that can be associated with the radio bearers. Additionally or alternatively, in some embodiments, one or more network elements of the cellular wireless network (e.g., the serving base station 104) can assign one or more of the unlicensed radio frequency band permission levels to radio bearers and can signal the assigned unlicensed radio frequency band permission levels to the wireless communication device 102, such as during radio bearer establishment and/or in an RRC reconfiguration message.

Operation 930 can include the wireless communication device 102 multiplexing uplink traffic for the plurality of radio bearers on the at least one licensed radio frequency band component carrier and the at least one unlicensed radio frequency band component carrier based at least in part on the unlicensed radio frequency band permission levels associated with the plurality of radio bearers. In some example embodiments, operation 930 can be performed at a MAC layer. Operation 930 can also take into account any PBRs for the radio bearers, such that the PBRs can be fulfilled within any constraints that may be imposed by the unlicensed radio frequency band permission levels and/or MAC PDU size grants. For example, operation 930 can be performed using the techniques for prioritization and multiplexing illustrated in and described hereinabove with respect to the examples of FIGS. 7 and 8. Operation 930 can be performed, in some example embodiments, for every TTI for which RLC PDU data is available.

In some example embodiments, the unlicensed radio frequency band permission level associated with a radio bearer can be changed on the fly. In this regard, when the wireless communication device 102 observes an increasing level of interference on an unlicensed radio frequency band component carrier and/or another indication that a quality of service level for a radio bearer cannot be met on the unlicensed radio frequency band component carrier, the wireless communication device 102, of some example embodiments, can be configured to change the unlicensed radio frequency band permission level of the radio bearer to force data to be communicated over one or more licensed radio frequency band component carriers and away from one or more unlicensed radio frequency band component carriers. For example, when a radio bearer is associated with a "licensed radio frequency band preferred" permission level and an interference level is noted on an unlicensed radio frequency band component carrier such that a minimum quality of service level for the radio bearer cannot be guaranteed to be satisfied on the unlicensed radio frequency band component carrier, the unlicensed radio frequency band permission level of the radio bearer can be changed to the "unlicensed radio frequency band forbidden" permission level. In some embodiments, a determination of an interference level on the unlicensed radio frequency band can, for example, be estimated based on a number of HARQ processes that can be triggered on an unlicensed radio frequency band component carrier.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for using an unlicensed radio frequency band component carrier for uplink transmission, the method comprising:

by a wireless communication device:

receiving a carrier aggregation configuration from a network element of a wireless network, wherein the carrier aggregation configuration comprises at least one licensed radio frequency band component carrier and at least one unlicensed radio frequency band component carrier;

establishing a plurality of radio bearers;

associating, with each radio bearer of the plurality of radio bearers, a corresponding unlicensed radio frequency band permission level that indicates whether uplink data for the radio bearer can be routed on the at least one unlicensed radio frequency band component carrier; and multiplexing uplink traffic for the plurality of radio bearers on the at least one licensed radio frequency band component carrier and the at least one unlicensed radio frequency band component carrier based at least in part on the unlicensed radio frequency band permission levels associated with the plurality of radio bearers and on a prioritized bit rate (PBR) for each of the plurality of radio bearers, wherein the unlicensed radio frequency band permission levels include:

an unlicensed radio frequency band forbidden permission level that disallows routing uplink data traffic on an unlicensed radio frequency band component carrier, a licensed radio frequency band preferred permission level that allows routing uplink data traffic on the unlicensed radio frequency band component carrier only when no licensed radio frequency band component carrier resources are available for a transmission time interval, and an unlicensed radio frequency band permitted permission level that allows routing uplink data traffic on the unlicensed radio frequency band component carrier when licensed radio frequency band component carrier resources are available.

2. The method of claim 1, wherein the licensed radio frequency band component carrier comprises a Long Term Evolution (LTE) component carrier using a licensed LTE radio frequency band, and wherein the unlicensed radio frequency band component carrier comprises an unlicensed LTE (LTE-U) component carrier.

3. The method of claim 1, wherein:
the associating, with each radio bearer of the plurality of radio bearers, the corresponding unlicensed radio frequency band permission level comprises associating the unlicensed radio frequency band forbidden permission level with a first radio bearer, and
multiplexing uplink traffic for the plurality of radio bearers comprises routing uplink traffic for the first radio bearer only on the at least one licensed radio frequency band component carrier.

4. The method of claim 3, wherein the first radio bearer carries data having less than a threshold level of delay tolerance and requiring more than a threshold throughput level.

5. The method of claim 1, wherein:
the associating, with each radio bearer of the plurality of radio bearers, the corresponding unlicensed radio frequency band permission level comprises associating the licensed radio frequency band preferred permission level with a first radio bearer, and
the first radio bearer carries data having more than a threshold level of delay tolerance and requirement more than a threshold throughput level.

6. The method of claim 1, wherein:
the associating, with each radio bearer of the plurality of radio bearers, the corresponding unlicensed radio frequency band permission level comprises associating the unlicensed radio frequency band permitted permission level with a first radio bearer, and
the first radio bearer carries best effort data.

7. The method of claim 1, wherein:
each radio bearer of the plurality of radio bearers has an associated quality of service level, and
the associating, with each radio bearer of the plurality of radio bearers, the corresponding unlicensed radio frequency band permission level comprises assigning the corresponding unlicensed radio frequency band permission level to each respective radio bearer based at least in part on the quality of service level associated with the respective radio bearer.

8. The method of claim 1, wherein the associating, with each radio bearer of the plurality of radio bearers, the corresponding unlicensed radio frequency band permission level comprises associating network assigned unlicensed radio frequency band permission levels with each radio bearer of the plurality of radio bearers.

9. The method of claim 1, wherein the multiplexing is performed at a media access control (MAC) layer of the wireless communication device.

10. The method of claim 1, wherein the multiplexing comprises multiplexing, for each of a plurality of transmission time intervals, data provided by a radio link control (RLC) layer for the plurality of radio bearers.

11. The method of claim 1, wherein multiplexing comprises fulfilling the PBR of each radio bearer on radio frequency band component carriers in accordance with the respective unlicensed radio frequency band permission level.

12. A wireless communication device configurable for using an unlicensed radio frequency band component carrier for uplink transmission with a wireless network, the wireless communication device comprising:
a wireless communication interface configurable to transmit signals to a plurality of cells of the wireless network using a plurality of radio frequency band component carriers;
processing circuitry comprising one or more processors and memory storing executable instructions, the processing circuitry communicatively coupled with the wireless communication interface; and
a multiplexing module communicatively coupled with the processing circuitry,
wherein the executable instructions, when executed by the one or more processors, cause the wireless communication device to:
receive a carrier aggregation configuration via one of the plurality of cells of the wireless network, the carrier aggregation configuration comprising at least one licensed radio frequency band component carrier and at least one unlicensed radio frequency band component carrier;
establish a plurality of radio bearers with one or more of the plurality of cells of the wireless network;
associate, with each radio bearer of the plurality of radio bearers, a corresponding unlicensed radio frequency band permission level that indicates whether uplink data for the radio bearer can be routed on the at least one unlicensed radio frequency band component carrier; and
multiplex uplink traffic for the plurality of radio bearers on the at least one licensed radio frequency band component carrier and the at least one unlicensed radio frequency band component carrier based at least in part on the unlicensed radio frequency band permission levels associated with the plurality of radio bearers and on a prioritized bit rate (PBR) for each of the plurality of radio bearers,
wherein the unlicensed radio frequency band permission levels include:
an unlicensed radio frequency band forbidden permission level that disallows routing uplink data traffic on an unlicensed radio frequency band component carrier,
a licensed radio frequency band preferred permission level that allows routing uplink data traffic on the unlicensed radio frequency band component carrier only when no licensed radio frequency band component carrier resources are available for a transmission time interval, and
an unlicensed radio frequency band permitted permission level that allows routing uplink data traffic on the unlicensed radio frequency band component carrier when licensed radio frequency band component carrier resources are available.

13. The wireless communication device of claim 12, wherein:
the wireless communication device associates, with each radio bearer of the plurality of radio bearers, a corresponding unlicensed radio frequency band permission level by at least associating the unlicensed radio frequency band forbidden permission level with a first radio bearer, and
the wireless communication device multiplexes uplink traffic for the plurality of radio bearers by at least routing uplink traffic for the first radio bearer only on the at least one licensed radio frequency band component carrier.

14. The wireless communication device of claim 12, wherein:
  each radio bearer of the plurality of radio bearers has an associated quality of service level, and
  the wireless communication device associates the corresponding unlicensed radio frequency band permission level with each radio bearer of the plurality of radio bearers based at least in part on the quality of service level associated with the respective radio bearer.

15. The wireless communication device of claim 12, wherein the wireless communication device multiplexes uplink traffic by at least fulfilling the PBR of each radio bearer on radio frequency band component carriers in accordance with the respective unlicensed radio frequency band permission levels.

16. A non-transitory computer-readable medium storing instructions that, when executed by one or more processors of a wireless communication device, cause the wireless communication device to:
  receive a carrier aggregation configuration via one of a plurality of cells of a wireless network, the carrier aggregation configuration comprising at least one licensed radio frequency band component carrier and at least one unlicensed radio frequency band component carrier;
  establish a plurality of radio bearers with one or more of the plurality of cells of the wireless network;
  associate, with each radio bearer of the plurality of radio bearers, a corresponding unlicensed radio frequency band permission level that indicates whether uplink data for the radio bearer can be routed on the at least one unlicensed radio frequency band component carrier; and
  multiplex uplink traffic for the plurality of radio bearers on the at least one licensed radio frequency band component carrier and the at least one unlicensed radio frequency band component carrier based at least in part on the unlicensed radio frequency band permission levels associated with the plurality of radio bearers and on a prioritized bit rate (PBR) for each of the plurality of radio bearers, wherein the unlicensed radio frequency band permission levels include:
  an unlicensed radio frequency band forbidden permission level that disallows routing uplink data traffic on an unlicensed radio frequency band component carrier,
  a licensed radio frequency band preferred permission level that allows routing uplink data traffic on the unlicensed radio frequency band component carrier only when no licensed radio frequency band component carrier resources are available for a transmission time interval, and
  an unlicensed radio frequency band permitted permission level that allows routing uplink data traffic on the unlicensed radio frequency band component carrier when licensed radio frequency band component carrier resources are available.

17. The method of claim 1, wherein the wireless communication device associates the unlicensed radio frequency band permission levels with each of the plurality of radio bearers based on a set of application requirements for applications that generate the uplink traffic.

18. The method of claim 1, further comprising:
  providing to the network element of the wireless network an indication of support for unlicensed radio frequency band component carriers, and
  receiving from the network element of the wireless network a set of unlicensed radio frequency band permission levels.

19. The method of claim 18, further comprising:
  receiving from the network element of the wireless network a set of associations between the set of unlicensed radio frequency band permission levels and the plurality of radio bearers.

20. The method of claim 19, further comprising:
  modifying the set of associations between the set of unlicensed radio frequency band permission levels and the plurality of radio bearers received from the network element of the wireless network based on a set of application requirements for applications that generate the uplink traffic.

* * * * *